United States Patent
Powell et al.

(10) Patent No.: US 7,376,551 B2
(45) Date of Patent: May 20, 2008

(54) DEFINITION EXTRACTION

(75) Inventors: Kevin R. Powell, Kirkland, WA (US); Kevin W. Humphreys, Redmond, WA (US); Saliha Azzam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 11/194,873

(22) Filed: Aug. 1, 2005

(65) Prior Publication Data
US 2007/0027863 A1 Feb. 1, 2007

(51) Int. Cl.
*G06F 17/28* (2006.01)

(52) U.S. Cl. .................... 704/4; 704/10; 704/9

(58) Field of Classification Search ............ 704/1–10, 704/251, 257, 270
See application file for complete search history.

(56) References Cited

U.S. PATENT DOCUMENTS 6,609,091 B1 * 8/2003 Budzinski .................. 704/9
7,254,530 B2 * 8/2007 Klavans et al. ............ 704/10

OTHER PUBLICATIONS

Search Report and Written Opinion dated Oct. 23, 2007 from International application No. PCT/US06/30094.

* cited by examiner

*Primary Examiner*—Huyen X. Vo
(74) *Attorney, Agent, or Firm*—Westerman, Champlin & Kelly, P.A.; Jonn D. Veldhuis-Kroeze

(57) ABSTRACT

A method of identifying definitions in documents includes receiving text units as an input. Which of the text units includes a cue phrase is then identified. For text units identified as including a cue phrase, localized parsing is performed around the cue phrase to determine whether the text unit including the cue phrase contains a definition.

13 Claims, 7 Drawing Sheets

TABLE 1

| A) Verbs patterns following the main term: |
| --- |
| "is the" |
| "is a ", "is an" |
| "was/were a\|an\|the" |
| "consist(s) of" |
| "is a type/kind/ of" |
| "called" |
| "is/are defined as" |
| "can be defined as" |
| "is one of" |
| "is used for" |
| "is regarded as" |
| B) Verbs occurring before the main term: |
| is/are called |
| called |
| is/are known as |
| Appositions: Acronyms |

FIG. 3

TABLE 2A

| Excluding Rules | |
|---|---|
| Explanation has "opinion/biased" modifier | Ruled out NP |
| Sentence Filters:<br>- Initial word of sentence (e.g., pronouns)<br>- Punctuation: e.g. '?' | Rule out sentence candidate |
| Main term is a definite | Ruled out - unless Proper name |
| "Context" of explanation | Set of POS filters |
| Stop word | Ruled out |
| Main term contain pronouns | Ruled out |
| Main term does not appear at end of text | For "called" patterns |
| Explanation is definite (has "the") and ends the sentence | For "IS\|WAS the" pattern |

- IS = "is" | "are"
- WAS = "was"| "were"

FIG. 4-1

TABLE 2B

| Features | Scoring rules |
|---|---|
| Certainty score of the matching pattern (cue phrase) | Scores: |
| • "IS a\|the" | Strong weight |
| • "WAS a\|the" | Negative weight |
| • "consist(s) of" | Negative weight |
| • "BE a type/kind of" | Strong weight |
| • "BE called" | Strong weight |
| • "called" | Negative weight |
| • "BE defined as a\|an\|the" | Strong weight |
| • "BE defined as" | Negative Weight |
| • "can be defined as" | Strong weight |
| • "IS one of the\|a\|an" | Strong weight |
| • " BE regarded as" | Strong weight |
| • " regarded as" | Strong weight |
| • "IS known as" | Strong weight |
| • Acronyms | Strong weight |
| Main term contains a Proper Name | Normal weight |
| Explanation segment length | Length score |
| Term segment length | Length score |
| Sentence length | Length score |
| Main term appears at beginning of sentence – i.e., term offset | Position score |
| Explanation term has a modifier (adjective, adverbs) | Negative - Basic weight |
| Explanation term is a definite ("the") | Negative – Basic<br>Exclusive when ends copula sentence |

- IS = "is" \| "are"
- WAS = "was"\| "were"
- BE = IS \| WAS

FIG. 4-2

DEFINITION EXTRACTION

BACKGROUND

The discussion below is merely provided for general background information and is not intended to be used as an aid in determining the scope of the claimed subject matter.

Finding definitions from textual sources is becoming an increasingly important feature in internet search engines, desktop search applications, and related search applications. An example of a related search application is a question answering (QA) application of the type designed to give a user specific answers to specific questions, as opposed to listing somewhat generically related links to web pages or documents as is typically provided in more traditional search engines. Using these various search applications, it is often desired to find definitions for a word, term or phrase, or to find information about a person (also referred to here as a definition).

With the growing amount of textual information found on the web, in e-mail, and/or in personal desktop data, new terms are being created every day, before dictionaries and encyclopedias have been updated with the terms. For example, the word "blog" was at one time not in the dictionary, yet even then internal textual sources of information relating to this word could be found. For example, relating to the word "blog," an internal textual source of information might include descriptive sentences like the one shown in Example 1:

EXAMPLE 1

"A blog is a system for publishing images, text and video on the web, a diary enrichable with any sort of multimedia content that one wishes to share with other surfers."

Further, some definitions can only be found in source texts. In other words, some words will not be listed in a dictionary because of the nature of the information that can only be found in textual data. On the other hand, finding accurate definitions in textual data can be challenging and can require expensive processing. Identifying textual data which accurately represents a definition presents numerous challenges. For example, the sentences provided below in Examples 2-4 illustrate that simple string matching, on definitional patterns like "is a", is not sufficient to identify whether or not a sentence contains a definition.

EXAMPLE 2

"Microsoft Corp. is a great software company in Redmond."

EXAMPLE 3

"Microsoft Corp. is a software company in Redmond"

EXAMPLE 4

"Today is a valid workday."

While all three of these sentences include the words or pattern "is a", only Example 3 represents a definition. The sentence of Example 2 represents an opinion, as opposed to a definition. The sentence of Example 4 also includes the definitional like pattern "is a", but it is not a definition.

In the context of huge amounts of new daily created data, and the need to respond quickly and accurately to user informational needs, it is important to supply efficient (fast) indexing pipelines for use in search engines, in components that crawl and process documents quickly (e.g., QA systems), etc., to find a proper definition or answer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A definition extraction system and method provides the ability to identify definitions in documents, for example web page documents, desktop documents, etc. The method and system can be optimized to identify definitions more quickly, more accurately, or a combination of the two by using shallow linguistic analysis. For example, in some embodiments, text units (such as sentences) which contain cue phrases are identified. These text units then undergo localized parsing around the cue phrase to determine whether they are likely to contain a definition.

BRIEF DESCRIPTION OF THE DRAWINGS

FIG. 3 is a table illustrating example cue phrases.

FIG. 4-1 is a table illustrating example excluding rules.

FIG. 4-2 is a table illustrating feature scoring aspects.

DETAILED DESCRIPTION

Disclosed embodiments include methods, apparatus and systems which analyze textual data and identify sentences, paragraphs or other textual units that contain definitions. The textual data can be, for example, in the form of web pages or other documents available over a global computer network such as the Internet. The textual data can also be a collection of documents on a local area network (LAN) or on a desktop. Further, the textual data from which definitions are extracted can be a single document or even a portion of a document.

Figure 1:
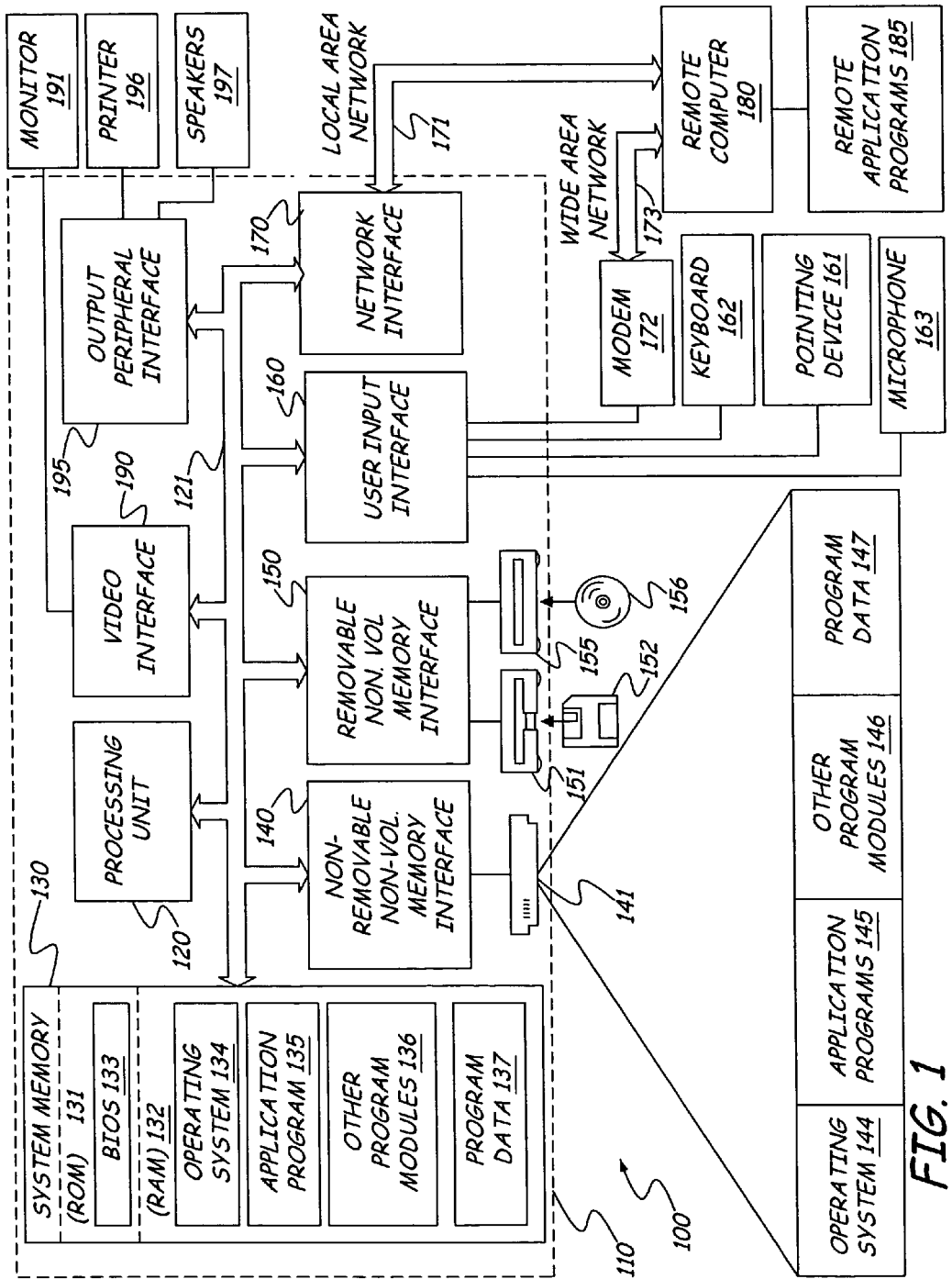
FIG. 1 is a block diagram of a general computing environment in which disclosed concepts can be practiced.

The methods, apparatus and systems can be embodied in a variety of computing environments, including personal computers, server computers, etc. Before describing the embodiments in greater detail, a discussion of an example computing environment in which the embodiments can be implemented may be useful. FIG. 1 illustrates one such computing environment.

FIG. 1 illustrates an example of a suitable computing system environment 100 on which one or more aspects of the illustrated embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Definition Extraction Systems and Methods

Figure 2:
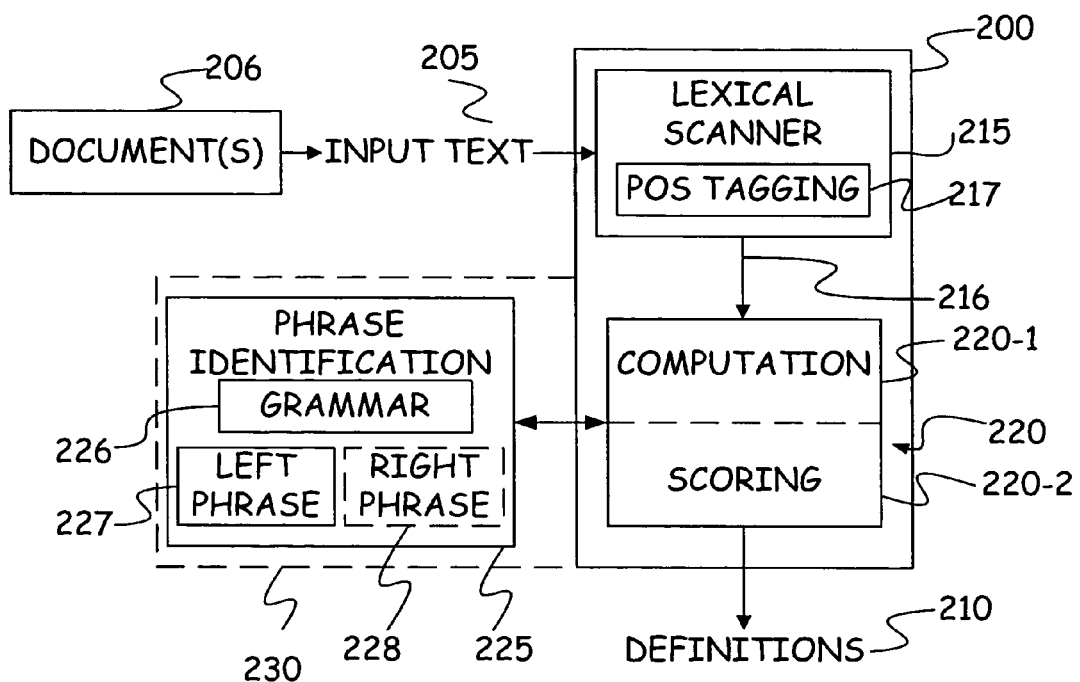
FIG. 2 is a block diagram of a definition extraction system.

Referring now to FIG. 2, shown is block diagram of a definition extraction system 200 which can be implemented in computing environments such as the one shown in FIG. 1. Definition extraction system analyzes textual data and identifies sentences or paragraphs that contain definitions. System 200, which operates in accordance with disclosed methods, receives input text 205, for example from document(s) 206. Documents 206 represent one or more complete documents, portions of documents, web pages, or other sources of text. Documents 206 can be sources of text available on a desktop environment, over a LAN, or over a global network such as the Internet, for example. Other sources of text can also be used.

In an exemplary embodiment, system 200 performs definition extraction in two separate stages. The first stage uses a scanner/generator 215 to identify those sentences or paragraphs that contain cue phrase patterns, as will be described below in some example embodiments. The sentences or paragraphs containing the cue phrases are then provided, as shown at 216 in FIG. 2, to a second stage of system 200. This second stage 220, referred to here as a definition computation and scoring stage, scores the definition candidates to determine which actually represent definitions. These definitions, or definition containing sentences or paragraphs, are provided as shown in FIG. 2 at 210. In some embodiments, computation and scoring stage 220 is implemented in two separate stages or components, computation component 220-1 configured to perform localized parsing on text units containing cue phrases, and scoring component 220-2 configured to score features of phrases in those text units. In other embodiments, these two functions can be implemented in a single component.

As will be described below in greater detail, computation and scoring stage 220 uses phrase identification, for example Noun Phrase (NP) identification, local to the identified cue phrase, to determine which definition candidates 216 actually contain or represent definitions. The phrase identification functions can be implemented using a phrase identification component or stage 225 which utilizes a grammar 226. In one example embodiment used to illustrate disclosed embodiments, grammar 226 is a NP grammar, but other grammars (e.g., verb phrase grammars, preposition phrase grammars, etc.) can be used in other embodiments. The phrase identification stage or component 225 can be considered part of system 200 if desired, and is therefore shown as optionally such by dashed lines 230. In some embodiments, if desired, phrase identification can also be implemented within computation and scoring stage 220. While phrase identification stage 225 is illustrated as being called by computation and scoring stage 220, phrase identification stage 225 can be functionally positioned between stages 215 and 220 within the scope of disclosed embodiments. FIG. 2 should be interpreted as also representing these embodiments. In some embodiments, phrase identification stage or component 225 performs left phrase identification as represented at 227 in FIG. 2, but only performs right phrase identification (represented at 228 in FIG. 2) if the left phrase identification succeeds as will be described below. Thus, in FIG. 2, right phrase identification 228 is shown in dashed lines to represents its optional or conditional nature.

It must be understood that phrase identification can be, in various embodiments, based on different linguistic constituents. For example, while NPs are the primary example used to describe embodiments, verb phrases (VPs), preposition phrases (PPs), or combinations of these or other syntactic phrase types can be used. Therefore, discussion of NPs in examples of this disclosure should be considered as supporting these other embodiments as well. For purposes of this example, phrase identification stage 225 can be considered a NP identification stage, grammar 226 can be considered to be a NP grammar, and left and right phrase identification 227 and 228 can be considered to be left and right NP identification in this example embodiment. In the following descriptions, such terminology is used. However, use of this terminology in this manner does not limit the invention to NP embodiments.

Cue Phrases Identification

Definition extraction component or system 200 uses a lexical scanner 215 to perform pattern matching to recognize copula verbs (e.g. "is a", "is the") and other cue phrases like "is defined as", etc—which form a closed class so the subsequent definition extraction code will know when a good candidate sentence is available for analysis. Lexical scanners are programs which recognize lexical patterns in text. Any of a variety of known scanner generators can be used to produce lexical scanner 215 from a set of lexical patterns. In one exemplary embodiment, lexical scanner 215 is generated by the Flex (fast lexical analyzer) scanner generator. Flex is software developed by the University of California, Berkeley and its contributors. Flex software is known in the art, and the United States Government has rights relating to Flex software pursuant to contract no. DE-AC03-76SF00098 between the United States Department of Energy and the University of California. Alternative scanner generators, such as Lex (developed by AT&T Bell Laboratories), could be used instead of Flex.

Referring now to FIG. 3, Table 1 lists examples of cue phrase patterns that lexical scanner 215 is configured to match in input text 205, in an example embodiment. The examples of cue phrases shown in Table 1 are provided as a non-exhaustive list of examples, without limitation to disclosed embodiments of lexical scanner 215, system 200, or corresponding methods. In the example list shown in Table 1, the cue phrase patterns are organized for illustrative purposes into two groups: (A) Verb patterns following the main term (the word for which a definition is being provided) of a string of input text; and (B) Verb patterns occurring before the main term. If lexical scanner 215 finds a match of a cue phrase in a particular paragraph, sentence, or text string of input text 205, it identifies such as a definition candidate for further processing/analysis by computation and scoring stage 220. If lexical scanner 215 does not find a match of a cue phrase, then the particular paragraph, sentence or text string is not considered as a definition candidate.

The two stage approach implemented in system 200 using stages, modules or components 215 and 220 to defer as much expensive (time and/or resource consuming) processing as possible in the definition extraction process. In this way the total number of sentences which need to be analyzed over all is minimized or significantly reduced, whereas a pure NP approach requires all NPs to be identified and then filtered and discarded downstream. In other words, system 200 and corresponding disclosed methods only look for definitions in the "neighborhood" of likely cue phrases (i.e., localized chunk/shallow parsing). This localized chunk/shallow parsing looks for and analyzes NPs within a predetermined window (i.e., number of words or number of characters) of the identified cue phrases.

In example embodiments, in order to improve or optimize performance, lexical scanner 215 is further configured to tag the words of input text 205 with their most common part of speech (POS) tags, for example during the same pass in which lexical scanner 215 searches for or identifies cue phrases. This is illustrated in FIG. 2 as POS tagging 217 in lexical scanner 215. The idea is to bypass the expensive lexicon lookup phase which provides such information during the NP parsing phase, and use the pre-assigned tags (most common POS tags in the context of a definition) instead. It must be noted that POS tagging 207 can be implemented, in other embodiments, by a component separate from lexical scanner 215, but is included in lexical scanner 215 in some embodiments to allow POS tagging during the same pass over input text 205 used for cue phrase identification, for an optimal performance.

Assigning only one POS tag to words during this phase involves POS tagging module or function 217 making disambiguating choices for words which have more than one possible POS tag. In fact, to avoid any ambiguity resolution for performance reasons, one unique tag is assigned by function 217 to words outside the sentence context based on its ability to be a NP for definitional purposes—the overall process being a trade off between accuracy and performance. The disambiguation rules implemented by POS tagging function 217 will have a direct impact on the accuracy of the NP grammar 226 in the next stage.

In example embodiments, some disambiguation rules consist, for example, of favoring "Noun" tags over "Verb" ones, since definition extraction will involve mostly looking for NPs rather than verbal phrases (VPs). That is, any word whose POS could be either a noun or verb will be tagged as a noun, i.e., verbs will therefore be ignored when identifying NPs. Also, in some embodiments, all unknown and non pre-tagged words will default to nouns. Another rule will favor adjectives over verbs, e.g.: in "used cars", "used" could always be tagged as an adjective, whereas if "used" appears in a verb position it will be ignored by the NP grammar 226 which only accounts for NP constituents.

Noun Phrase Identification and Definition Scoring

Once a candidate sentence is analyzed and identified by stage 215, NP identification component 225 is used by computation and scoring stage 220 to identify its NP constituents. As will be described in greater detail below, with the NP constituents identified, computation and scoring stage 220 analyzes and, if appropriate, scores the candidate sentence. For any scored candidate definition sentence, if the score exceeds a threshold, then system 200 can mark the sentence with the appropriate information for retrieving the definition. In other words, the sentence is marked with information which is indicative of both the fact that the sentence contains a definition, and of what term is being defined. For example, marking the sentence can include adding the appropriate offsets (i.e., position of definition term in sentence or other text) to the sentence or text properties. These sentence or text properties, for illustrative purposes, are in some embodiments included in definitions output 210 shown in FIG. 2.

For speed performance reasons, the identification of the NPs in a candidate definition sentence is local (within a predetermined window) to the cue phrase, that is, only the surrounding NPs of the cue phrase patterns are parsed, as opposed to running the grammar rules of grammar 226 on the whole sentence. The predetermined window which controls the identification of NPs in a candidate sentence is in some disclosed embodiments a number of words, for example three words, five words, etc. In other embodiments, the predetermined windows can be established by other criteria than the number of words. For example, the predetermined windows can be a number of characters.

Once a candidate sentence is analyzed and the constituent NPs are identified, stage 220 of system 200 will then score the definition. When identified as such, a definition is everything until the end of the sentence or paragraph, depending on the unit of processing. However the scoring uses the surrounding context (i.e., NP) of the cue phrase to produce the score and validate or reject the definition. Prior to scoring, the candidate sentence can be analyzed using a set of excluding rules, for example such as the set of rules provided for illustrative purposes in Table 2A shown in FIG. 4-1. A method of analyzing and scoring identified candidate definition sentences is provided in the flow diagram shown in FIG. 5. The example excluding rules shown in Table 2A of FIG. 4-1, as well as scoring rules shown in Table 2B of FIG. 4-2, are described in further detail in the context of a discussion of the method shown in FIG. 5. For performance reasons, excluding rules can be applied early in the process when possible (depending on the rule parameters), thereby ruling out sentences earlier to prevent unnecessary processing on these sentences. For instance, some sentences can be rejected before the NP constituents are identified, if they contain obvious excluding patterns that do not need the NP constituent input, for example "initial pronouns", etc. As mentioned previously, while FIG. 5 illustrates concepts in terms of NPs, in other alternative embodiments also represented by FIG. 5, NPs can be replaced with other phrase types, for example VPs, PPs, or combinations of phrase types.

In one embodiment, the algorithm proceeds as follows for a given sentence in which a cue phrase has been identified. At step 405, a left NP that precedes the cue phrase is searched for by applying the NP grammar 226 locally to the cue phrase. Applying the NP grammar locally to the cue phrase in this step means that words within a predetermined window on the left hand or preceding side of the cue phrase are analyzed with the NP grammar 226 to determine if any are the left NP. Any such left NP would tend to represent the main term (term being defined) in a definitional sentence with a cue phrase like 'is a'. If at decision step 407 it is determined that no left NP has been found locally to the cue phrase, then the algorithm or method exits, as shown at step 409, and it is determined that no definition is likely to exist in the candidate sentence. If at decision step 407 it is determined that a left NP has been found locally to the cue phrase, then at step 411 a determination is made as to whether any of a set of excluding rules apply to the left NP, or to the candidate sentence in general. As described above, any excluding rules that do not need the NP constituents as parameters are applied earlier when possible in some embodiments.

Table 2A shown in FIG. 4-1 represents one example set of excluding rules which can be used to analyze candidate sentences. Some of the excluding rules apply to the left NP. Others of the excluding rules apply to the right NP. Still others apply to the candidate sentence in general. It must be understood that the excluding rules illustrated in Table 2A are provided as an example, and are not intended to represent an exhaustive set of excluding rules. Also, it is not necessary in all embodiments to use every excluding rule illustrated. The excluding rules can be established for particular implementations to tailor results accordingly.

The first excluding rule illustrated applies to the explanation part (which can either be the left NP or right NP depending on the pattern). This rule applies to situations where the explanation has an "opinion/biased" modifier word or words, such that it wouldn't ordinarily be likely to be a definition term. These can also be referred to as subjective words. An example, but not exhaustive, list of some opinion/biased modifiers is as follows:
humble
ideal
idyllic
ignoble
ignorant
immature
imperfect
important
improbable
incorrect
incredible
indispensable
inappropriate
insignificant
insincere
intelligent
irresponsible
mature
marvelous
nasty
nice
offensive
perfect A second type of excluding rule includes sentence filters which serve to rule out candidate sentences if the sentences have certain features. This is an example of an excluding rule which does not use NP constituents, as was introduced above. One such feature is when the initial word of the sentence is for example a pronoun, which is not characteristic of a definitional sentence. Another such feature is the candidate sentence having punctuation which is not indicative of a definition, for example a question mark at the end or punctuation marks that are not indicative of a complete sentence.

A third illustrated type of excluding rule relates to whether the main term is definite. If the NP is definite, e.g., has the article "the", thus introducing a previous context of use, it is not likely to be a term defined in this sentence. Defined terms are usually presented in a generic context. An exception to this general rule is that if the main term is a proper name, then it is not ruled out on this basis.

A fourth illustrated type of excluding rule relates to the surrounding context of the explanation part which is, for example for cue phrases like "is a", the right NP that follows the cue phrase. The explanation represents the start of the definition or description for a main term. The right context of the explanation of a cue phrase like "is a" can be determined for example using a set of POS to identify classes of words, having predetermined POS, which are likely indicative of the explanation representing (or alternatively not representing) a definition. For an example of a POS filter, if the explanation is followed by a word whose POS is a demonstrative pronoun, for example "this", the candidate sentence is ruled out given the "referring" context of "this" which is less likely to contribute to a definition. While if the POS of a word following the explanation was a relative pronoun like "that", it will reinforce the fact that the sentence is a definition, since "that" is more likely to extend a definition description (i.e., an explanation).

A fifth illustrated type of excluding rule uses stop words, which if found in the particular term or explanation, are highly indicative of a sentence not including a definition, and thus rule out the candidate sentence. Stops words will often apply to the explanation part, but not necessarily the term. An example, but not exhaustive, list of some stop words is as follows:
aspect
beauty
bliss
bore
boredom
contentment
counterpart
challenge
chance
danger
dishonor
disgrace
disappointment
displease
jerk
joke
relief
revelation
success
threat
waste
wonder Another excluding rule can include the main term containing pronouns, which rules out the candidate sentence. Another excluding rule can include the main term not appearing at the end of text for "called" patterns. An example of a good definition with a "called pattern" is provided as follows: "Colorless, precious corundum is called white sapphire". In this example, the term is "white sapphire". This example rule says that if the term is not the end of the sentence (i.e., if it is followed by other words), it is not a definition. As a further example, this rule would prohibit the following example from being a definition: "Colorless, precious corundum is called white sapphire in America."

Yet another can include the explanation being definite (having "the" as a determiner) and ending the sentence for the "IS|WAS the" pattern, which is not indicative of a definition and rules out the candidate sentence. This example rule rules out the sentence when the explanation is definite and ends the sentence, meaning there is nothing after the explanation. An example is provided as follows: "Lucerne is the only large city." In this example, the explanation "the only large city" is definite and ends the sentence. The motivation for this example rule is that "the only large city", often refers to a previous context, and thus is not a good candidate for a generic definition.

Referring back to FIG. 5, if it is determined at step 411 that any excluding rules apply in a manner which excludes the candidate sentence from being a definition, then at step 413 the algorithm or method exits, and it is determined that no definition is likely to exist in the candidate sentence. If it is determined at step 411 that no excluding rules apply in a manner which rules out the candidate sentence, then the method proceeds to step 415 where positive and negative left NP scoring is applied by stage, module or component 220. Scoring is described in greater detail below with reference to Table 2B shown in FIG. 4-2. In Table 2B and elsewhere, the words "term" and "explanation" are used to describe disclosed embodiments. A "term" is the NP for which the definition is being described. The "explanation" is the start of the definition or description for the "term". For example, for the cue phrase "is a", the term will be the left NP that has been identified in step 405. In an example embodiment, the positive and negative scoring applied in this case on the left NP are the rules referring to "term" in Table 2B. The positive and negative scoring applied in this case on the right NP are the rules which are referring to "explanation" in Table 2B.

After scoring the left NP segment at step 415, the method proceeds to step 417, where the right NP which follows the cue phrase is searched for by applying the NP grammar 226 locally to the cue phrase. Applying the NP grammar locally to the cue phrase in this step means that words within a predetermined window on the right hand or following side of the cue phrase are analyzed with the NP grammar 226 to determine if any are the right NP. Any such right NP would tend to represent an explanation term in a definitional sentence whose cue phrase is an "is a" pattern. It must be noted that the window used to apply the NP grammar 226 locally to the cue phrase can differ for the left and right NPs, and can be tailored to optimize accuracy, speed, or a combination of the two.

Next, at step 419, a determination is made as to whether the right NP was found. If the right NP was not found, then at step 421 the algorithm or method exits, and it is determined that no definition is likely to exist in the candidate sentence. If it is determined at step 419 that the right NP has been found, then at step 423 a determination is made as to whether the excluding rules apply as was described above. In this step, the appropriate excluding rules are applied to the right NP of the candidate sentence. If at step 423 it is determined that an excluding rule applies in a manner which excludes the candidate sentence from being a definition, then at step 425 the algorithm or method exits, and it is determined that no definition is likely to exist in the candidate sentence. If it is determined at step 423 that no excluding rule excludes the candidate sentence, then the method continues to step 427 where positive and negative right NP scoring is applied as will be described below in greater detail.

Next, at step 429, the left NP score and the right NP score are combined, and at step 431 a determination is made as a function of the combined score as whether the candidate sentence includes a definition. In an example embodiment, this step is implemented by comparing the combined scores to a threshold. If the combined scores do not exceed the threshold, then the algorithm exits at step 433 and it is determined that no definition is likely to exist in the candidate sentence. If the combined scores do exceed the threshold, then at step 435 a definition is provided as an output. This step can include tagging the candidate sentence as containing a definition, adding the appropriate offset (position of the definitional term in the sentence), and/or providing the sentence itself at the output. It must be noted that step 431 of determining, as a function of the combined score, whether the candidate sentence includes a definition can be implemented in other manners. For example, the scoring can be defined in alternative embodiments such that to be a good definition candidate, the combined scores cannot exceed a threshold.

Definition Scoring

In steps 415 and 427 described above with reference to FIG. 5, left and right NP scoring is applied. For scoring definition, a general approach applied in embodiments is to define strong heuristic patterns to identify a good definition candidate, while ruling out noisy candidates using excluding rules and a threshold for scoring. Such heuristics will apply on both the definition term (i.e., the term being defined) and the corresponding NP description (i.e., the explanation), referred to above as either the left and right NP, depending on the pattern. While embodiments have been described with reference to the left NP representing the term being defined and the right NP representing the explanation, this need not always be the case. Embodiments of the invention can be configured to process the opposite configuration as well, where the left NP represents the explanation and the right NP represents the term being defined.

Examples of sets of features that are applied for scoring are listed in Table 2B shown in FIG. 4-2. These features and their corresponding type of scoring weight (e.g., strong weight, negative weight, normal weight, etc.) are provided as an example only. Other scoring techniques can be used in other embodiments tailored for specific purposes. Note that the "strong" feature weight represents the maximum weight assigned to a given feature, while the "basic" feature weight is the standard weight assigned by default to features which are not strong features. The actual numeric values used to represent the "strong" feature weight and the "basic" feature weight can be set as desired to achieve particular results.

A feature with a positive weight (value) means that the weight is added to the computed score when the matching term has the feature. A feature with a negative weight means that the corresponding feature weight is subtracted from the computed score when the matching term has the corresponding feature. Length and position scores are weights which encode the length of terms or sentences or their offset position.

Some features are associated with a strong feature weight which represents the maximum weight assigned to a given feature, while some are assigned a basic feature weight which is the standard weight assigned by default to non strong features. The scoring function combines the various weights associated to these features in a linear function to produce a final score.

Final Score=(positive feature weights)−(negative feature weights)

In this equation, the sum of the negative feature weights represents a sum of the absolute values of the negative feature weights. In other words, subtracting the sum of the negative feature weights from the sum of the positive feature weights serves to lower the final score, not to raise it. The final computed score is then compared to the threshold to decide whether the definition should be accepted and exposed as a property of the sentence. Being able to set up and/or change a threshold allows applications to control the quality of definitions that are emitted, without having to change the whole approach algorithms, if requirements for recall and/or precision are different for distinct domains.

The following description includes scoring of three sentence examples. The three sentence examples are scored based on the following formula:

Score=ScoreOf(Cue phrase Pattern)+ScoreOf(LeftNP)+ScoreOf(Right NP)

A fourth example sentence is excluded due to an excluding rule.

SCORING EXAMPLE 1

"St Dunstan is the patron saint of blacksmiths and goldsmiths."

Left NP (Term): St Dunstan

Right NP (Explanation): the patron saint

Pattern: "is the"

ScoreOf(Pattern)=0.6

ScoreOf(Term)=ScoreOf(Proper Name)=0.2

ScoreOf(Explanation)=ScoreOf("Explanation is a definite: the")=−0.1

Check excluding rule: POS of right context of Explanation: "preposition" ("of")->Accepted Final score is: 0.6+0.2−0.1=0.7

SCORING EXAMPLE 2

"In Minoan civilization the large storage jars were known as pithoi."

Left NP(Explanation): the large storage jars

Right NP(Term): pithoi

Pattern: "known as"

ScoreOf(Pattern)=0.6

ScoreOf(Term)=ScoreOf(TermOffset)=0.6 (for this pattern, the closer to the end of the sentence the term is, the bigger the score−in this case it is the highest value the term can get for this feature since it is ending the sentence)

ScoreOf(Explanation)=ScoreOf("Explanation is a definite: the")+

ScoreOf("Explanation has a Modifier:large")=−0.1−0.1=−0.2

Final score is: 0.6+0.6−0.2=1.00

SCORING EXAMPLE 3

"A vulnerability is a specific way that a threat is exploitable based on an unmitigated attack path."

Left NP(Term): A vulnerability

Right NP(Explanation): specific way

Pattern: "is a"

ScoreOf(Pattern)=0.6

ScoreOf(Term)=0 (no feature scoring apply)

ScoreOf(Explanation)=ScoreOf(Explanation has a Modifier:specific)=−0.1

Check excluding rule: POS of right context of Explanation: "that"->Accepted

Final score is: 0.6+−0.1=0.5

EXCLUDED SENTENCE EXAMPLE

"Lucerne is the only large city."

Left NP(Term): Lucerne

Right NP(Explanation): the only large city

Pattern: "is the"

The excluding rule below will apply on the explanation part (Right NP in this case) ruling out the sentence as a definition.

Excluding rule which is applied for "IS|WAS the" patterns:

The explanation is definite (has "the" in this case) and ends the sentence.

Figure 5:
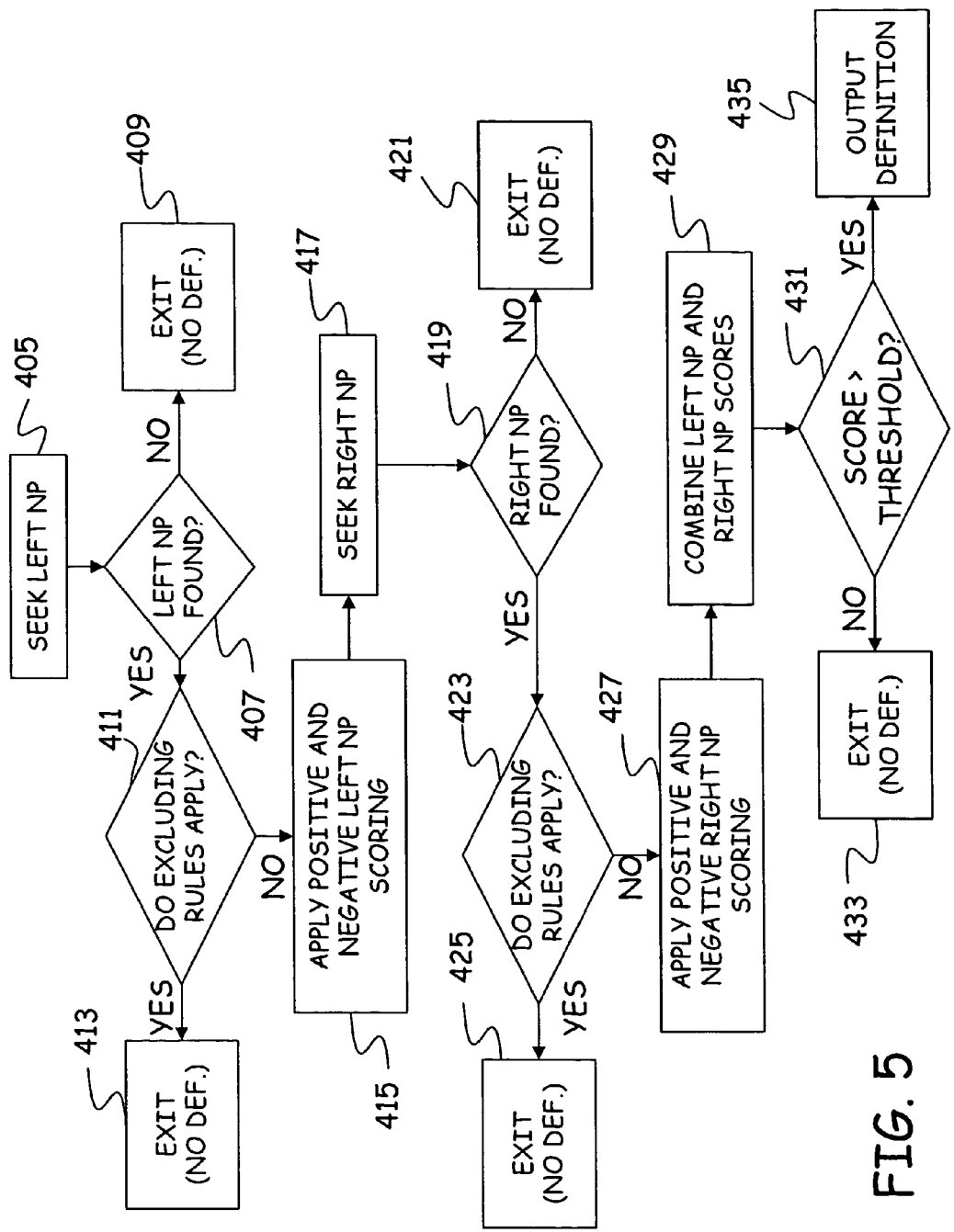
FIG. 5 is a flow diagram illustrating a method embodiment.
Figure 6:
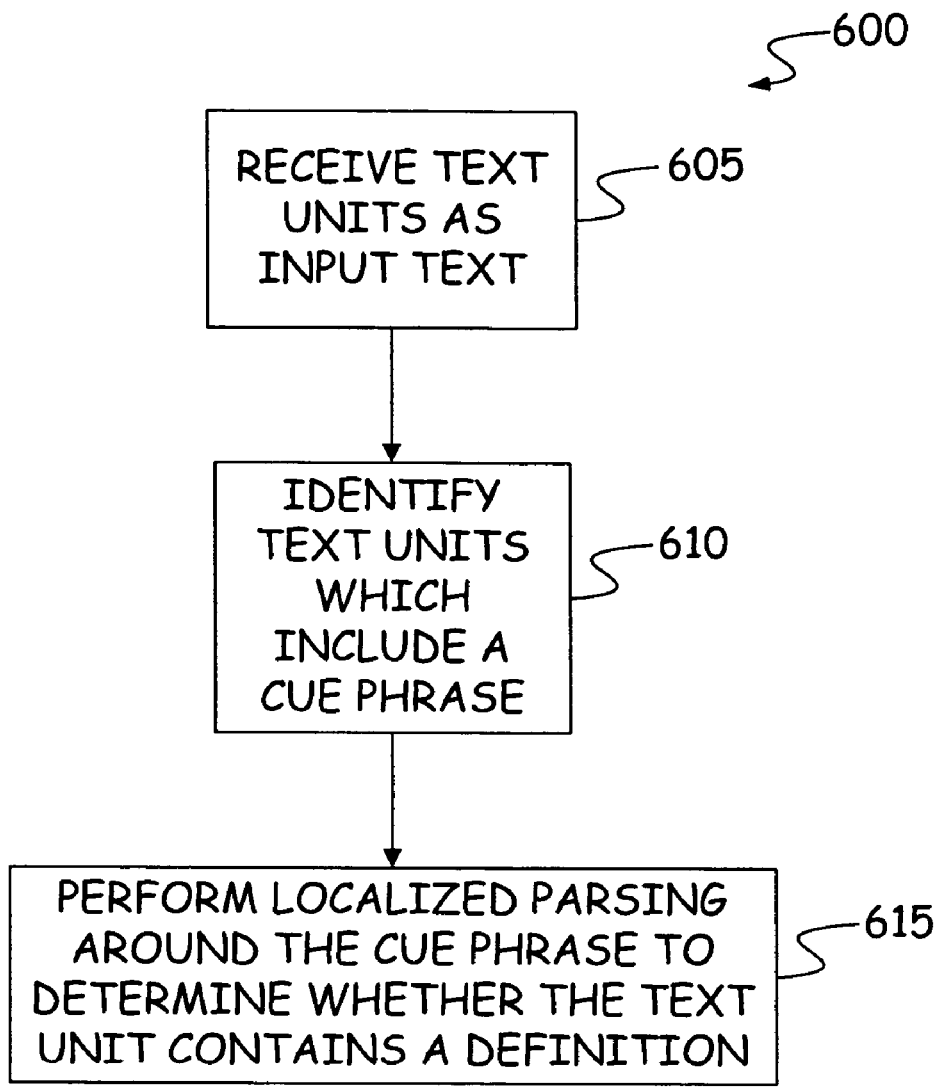
FIG. 6 is a flow diagram illustrating a method embodiment.

While FIG. 5 illustrates one specific method embodiment of the disclosed methods of identifying definitions in documents, other more general embodiments are also disclosed. For example, referring now to FIG. 6, shown in flow diagram 600 is one such method embodiment. As shown at block 605, this method embodiment includes the step of receiving as input text a plurality of text units. As noted, these text units can be sentences, paragraphs, etc. Then, as shown at block 610, the method includes the step of identifying which of the plurality of text units includes a cue phrase. As described above, this can be done with a lexical scanner and a list of cue phrases which can be pattern matched to the text units. Then, as illustrated at block 615, this method embodiment includes the step of, for text units identified as including a cue phrase, performing localized parsing around the cue phrase to determine whether the text unit including the cue phrase contains a definition. The localized parsing steps can be, for example, as shown in FIG. 5.

For example, performing localized parsing around the cue phase of a text unit can include searching for a main term NP (i.e., the left NP in many embodiments) in the text unit within a first predetermined window of the cue phrase, as was described in FIG. 5. Similarly, performing localized parsing can include searching for the explanation NP (i.e., the right NP in many embodiments) within a second predetermined window of the cue phrase, as was previously described and illustrated. Of course, the first and second windows can be equal in size, or separately established to have unequal sizes. Other more detailed features of the method embodiment shown in FIG. 6 can be substantially the same as described above and illustrated in the other FIGS. For example, the scoring of main term NPs and explanation NPs can be as illustrated in FIG. 5 and described above. Similarly, other features of this method embodiment can be as described and illustrated above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while embodiments are described with reference to English language examples, the embodiments are not limited to English or any particular language. As another example, while localized parsing can be considered to include searching for NPs in some illustrated embodiments, in other embodiments localized parsing includes searching for other linguistic constituents, such as VPs, PPs, combinations of phrase types, etc.

What is claimed is:

1. A method of identifying definitions in documents, the method comprising:
   receiving as input text a plurality of text units;
   identifying which of the plurality of text units includes a cue phrase;
   eliminating from consideration of potentially containing a definition any of the plurality of text units which do not include a cue phrase;
   for text units identified as including a cue phrase, performing localized parsing around the cue phrase to determine whether the text unit including the cue phrase contains a definition, wherein performing localized parsing around the cue phrase of the text unit comprises searching for a left phrase in the text unit within a first predetermined window of the cue phrase and searching for a right phrase in the text unit within a second predetermined window of the cue phrase;
   applying positive and negative scoring to the left phrase and the right phrase based upon a set of scoring rules to obtain phrase scoring;
   combining the scoring for the left phrase and the right phrase to obtain an overall score for the text unit; and
   determining whether the text unit including the cue phrase contains a definition as a function of the overall score for the text unit.

2. The method of claim 1, wherein searching for the left phrase and the right phrase further comprises searching for a syntactic phrase.

3. The method of claim 2, wherein searching for the left phrase and the right phrase in the text unit within the first and second predetermined windows of the cue phrase comprises:
   searching for a phrase in the text unit preceding and within the first predetermined window of the cue phrase.

4. The method of claim 1, and further comprising:
   determining whether the left phrase and the right phrase were identified in the text unit within the first and second predetermined windows of the cue phrase; and
   determining that the text unit including the cue phrase does not contain a definition if the left phrase and the right phrase were not identified in the text unit within the first and second predetermined windows of the cue phrase.

5. The method of claim 4, and if it is determined that the left phrase and the right phrase were identified in the text unit within the first and second predetermined windows of the cue phrase, then further comprising:
   determining whether any of a set of excluding rules apply to the left phrase or the right phrase in a manner which is indicative of the text unit not containing a definition; and
   determining that the text unit including the cue phrase does not contain a definition if it is determined that any of the set of excluding rules apply to the left phrase or the right phrase in a manner which is indicative of the text unit not containing a definition.

6. The method of claim 5, and if it is determined that none of the set of excluding rules apply to the left phrase or the right phrase in a manner which is indicative of the text unit not containing a definition, then further comprising:
   applying positive and negative scoring to the left phrase and the right phrase based upon a set of scoring rules to obtain phrase scoring for the left phrase and the right phrase.

7. The method of claim 1, wherein receiving as input text the plurality of text units further comprises:
   receiving as the input text a plurality of sentences.

8. The method of claim 1, and further comprising tagging words in the text unit with part of speech (POS) tags based upon their most common parts of speech in the context of a definition.

9. The method of claim 8, wherein tagging words in the text unit with POS tags based upon their most common parts of speech in the context of a definition further comprises:
   tagging words in the text unit with POS tags during a same processing pass through used to identify which of the plurality of text units includes a cue phrase.

10. A definition extraction system for identifying definitions in documents, the definition extraction system comprising:
    a lexical scanner component configured to receive a plurality of text units as an input and to identify which of the plurality of text units includes a cue phrase, the lexical scanner configured to eliminate from consideration any of the plurality of text units which do not include a cue phrase;
    a computation component configured to perform localized parsing, on text units determined by the lexical scanner component to include a cue phrase, around the cue phrase to determine whether the text unit contains a definition; and
    a scoring component configured to apply positive and negative scoring to a left phrase and a right phrase of the text unit within predetermined windows of the cue phrase based upon a set of scoring rules to obtain phrase scoring, the scoring component combining the scoring for the left phrase and the right phrase to obtain an overall score for the text unit, and determining whether the text unit including the cue phrase contains a definition as a function of the overall score for the text unit.

11. The definition extraction system of claim 10, wherein the lexical scanner component is further configured to tag words of each text unit with their respective most common parts of speech (POS) in the context of a definition.

12. The definition extraction system of claim 11, wherein the lexical scanner component is further configured to tag the words of each text unit with their respective most common POS during a same processing pass through used to identify which of the plurality of text units includes a cue phrase.

13. The definition extraction system of claim 12, and further comprising a phrase identification component configured to identify left and right phrases within the predetermined windows of the cue phrase of text units determined to include a cue phrase, the computation component being further configured to perform the localized parsing using the identified left and right phrases.

* * * * *